F. A. WOODSON.
Magazine Stove.
No. 3,424. Reissued May 4, 1869.
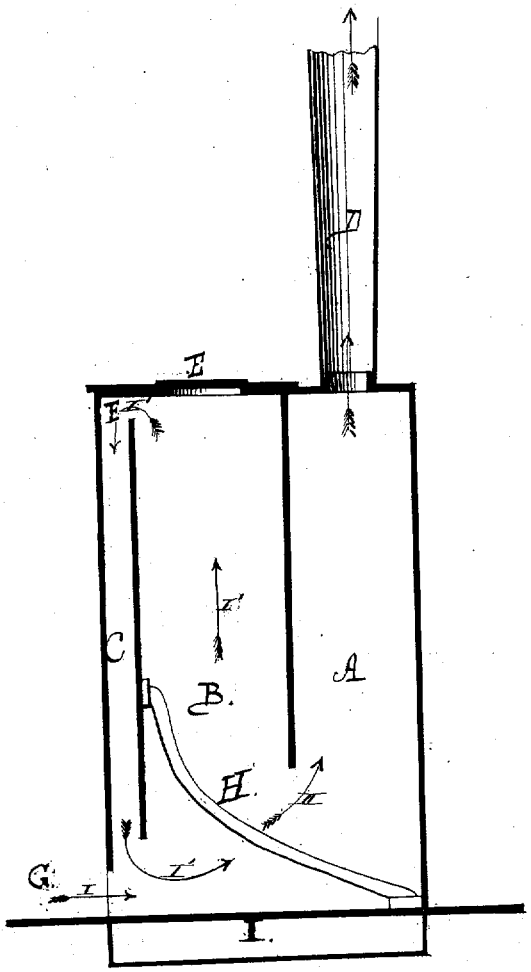
Witnesses
Jacob F. Henry
Phil. F. Larner
Inventor
F. A. Woodson
by Dieterich
Attys
N. PETERS, PHOTO-LITHOGRAPHER, WASHINGTON, D. C.

United States Patent Office.

FREDERICK A. WOODSON, OF ANNA, ILLINOIS.

*Letters Patent No.* 86,620, *dated February* 2, 1869; *reissue No.* 3,424, *dated May* 4, 1869.

HOT-AIR FURNACE.

The Schedule referred to in these Letters Patent and making part of the same.

*To all whom it may concern:*

Be it known that I, FREDERICK A. WOODSON, of Anna, in the county of Union, and State of Illinois, have invented a new and useful Smoke-Burning Furnace; and I do hereby declare the following to be a full, clear, and exact description thereof, sufficient to enable those skilled in the art to which my invention appertains, to make and use the same, reference being had to the accompanying drawing, forming a part of this specification, and in which my invention is illustrated by a central vertical longitudinal section.

My invention is designed as a process for separating the volatile from the ponderable constituents of wood, or coal, and reuniting them, in conjunction with a fresh supply of air, at the point of greatest heat, and there exhausting all the combustible elements of the fuel.

In the drawings—

A represents the fire-chamber, and

B, the fuel-chamber, partially separated from each other by a pendent partition.

C is a flue, which communicates only at top and bottom with the chamber B, being separated therefrom, except at the points mentioned, by a partition.

D is a chimney, communicating with fire-chamber A.

At E may be an opening, through which fuel is supplied.

G is the opening through which fresh air enters the furnace.

H is the grate, and

I, the ash-box.

The chamber A is used as a fire-box, and from it the heat radiates and escapes.

It is intended that the fuel shall be contained only in the central portion of chamber B, above the grate, while the upper part of said chamber is to serve as a reservoir for smoke and gas. In the lower part, the atoms of oxygen and hydrocarbon are combined and heated before combustion.

The chamber C is simply a passage, or flue, communicating, as above stated, with the chamber B, both at top and bottom.

The draught-opening G is the whole width of the furnace, and is so located, relatively to the chambers A B C, that the current of air cuts under them in its direct draught to the place of greatest heat, at the base of A.

The slanting grate H is placed far enough from the partition between A and B to admit the descending fuel.

The operation is as follows:

A fire is made in the base of A; afterward B is filled, or partially filled with fuel.

All the smoke and gases evolved from the body of the fuel in B (except that directly under the fire-chamber A) rise, by rarefaction, to the top of B, and the ponderable parts descend by gravity to the bottom of A.

The current of air entering at G, creates a vacuum at the lower part of C, and draws the smoke and gases from the top of B to the vacant space at the bottom of B, when the oxygen and hydrocarbon are mixed, and also heated, to some extent, in their passage to the base of A, when a union is made with the ponderable parts of the fuel, and combustion takes place; thence an exit through the chimney; or, if the upper part of fire-chamber A is deflected from fuel-chamber B, withdrawing its heat therefrom, a part of the fresh air entering at G, will ascend C and mix with the gases in B, through which they descend to the place of exit, with results similar to the other operation.

I do not claim the process of burning smoke, nor of producing a smokeless stove; but I do claim a furnace by which the volatile matters are separated from the ponderable constituents of fuel and reunited with a fresh supply of air at the point of greatest heat, substantially as and for the purpose described.

FREDERICK A. WOODSON.

Witnesses:

JOHN L. PATERSON,

SAMUEL LEWIS.